Oct. 4, 1955
E. E. TREIS
2,719,904
ELECTRICALLY HEATED BEAK CUTTING TOOL
Filed April 11, 1952
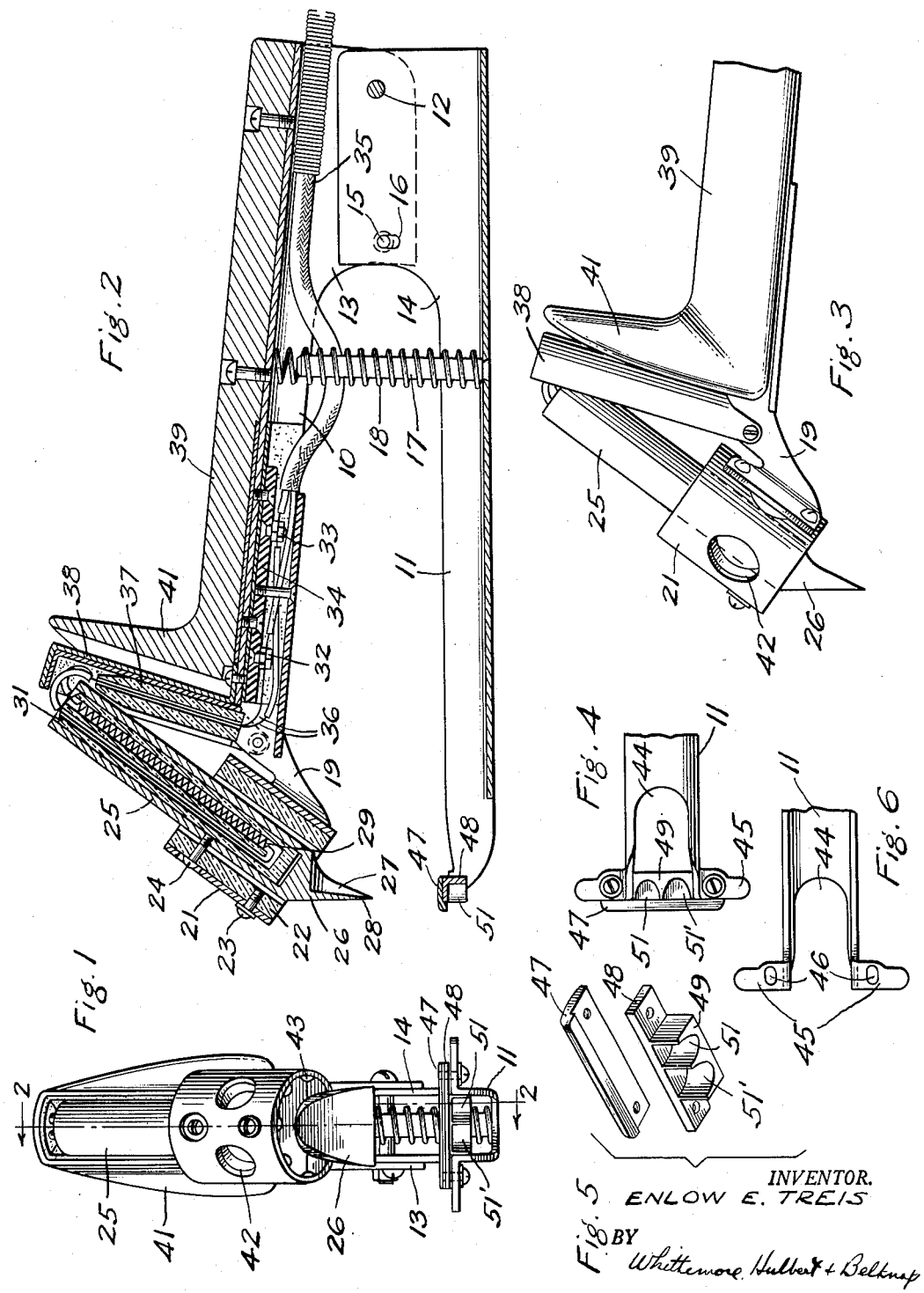
INVENTOR.
ENLOW E. TREIS
BY
Whittemore, Hulbert + Belknap
ATTYS.

United States Patent Office 2,719,904
Patented Oct. 4, 1955

2,719,904

ELECTRICALLY HEATED BEAK CUTTING TOOL

Enlow E. Treis, Milbank, S. Dak.

Application April 11, 1952, Serial No. 281,720

5 Claims. (Cl. 219—21)

The present invention relates to a combined cutter and cauterizer for removing a portion of the upper beaks of young fowl. More particularly the invention pertains to a relatively light and easily manipulated portable hand tool having electrical heating means associated with a cutting blade forming an element of the tool.

One of the objects of the invention is to provide a tool having a pair of handles pivotally connected to each other, one of the handles having a heated blade thereon, the other handle having a guide or stop against which the lower beak of the fowl is held and which insures uniform cutting of upper beaks.

Another object of the invention is to provide a portable cutting tool adapted to be connected to any suitable source of electric current to heat an element associated with the cutting blade of the tool.

Other objects of the invention will be apparent from the following description of the invention when taken with the accompanying drawings in which:

Fig. 1 is an end elevation of the cutting tool;

Fig. 2 is a vertical section taken on line 2—2 of Fig. 1;

Fig. 3 is a fragmentary elevation of the blade heating means;

Fig. 4 is a fragmentary bottom view of the guide and stop forming part of the lower handle of the tool;

Fig. 5 is a perspective view of the guide shown in Fig. 4, the parts being in disassembled relation; and Fig. 6 is a fragmentary top view of the end of the lower arm of the tool.

In the drawings, it will be seen that the upper handle 10 is pivotally connected to the lower handle or arm 11 on pin 12. Arms 10 and 11 are provided with flange portions 13 and 14, respectively, flange 13 having a stop pin 15 secured thereto and cooperating with slot 16 in flange 14 to limit the movement of the handles with respect to each other. A post 17 secured to one of the handles, preferably, as shown in the drawing, to arm 11, is surrounded by a coil spring 18 which forces the handles apart to a normally open position.

Detachably secured to the free end of the upper handle 10 by means of bracket 19 is a cylindrical jacket 21 having therein a tubular insulator 22 attached to the sleeve by means of screw 23. Also secured to, but spaced from, jacket 21 by screw 24 is an elongated cylindrical heat conducting member 25, the lower end of which is fashioned to form a cutting blade 26. It will be seen from Figs. 1 and 2 that the terminal portion of this blade is so ground that it provides a relatively wide cutting edge at each end of which is a tapered fin or flange 27 to provide strength and support for the tapered thin portion 28 of the blade as well as to conduct heat to the cutting edge.

Positioned within the hollow member 25 is an electrical heating element 29 suitably insulated from the metallic cutting blade by a hollow insulating sleeve 31. Connectors 32, 33 secured to a non-conducting plate 34 on the upper handle permit the heating element to be connected to a conventional two-wire cord 35, the wires 36 passing through an insulating sleeve 37 within the semi-cylindrical guard 38 attached to the upper handle. The upper handle is partially surrounded by a protective grip member 39 formed from a material which is a poor conductor of electricity as well as of heat. It will be noted that the front portion of the grip is formed to provide an upstanding shield 41 spaced from but partially surrounding guard 38 better to protect the hand of the operator against contact with the heated upper portion of the cutting blade. It will also be observed that the jacket 21 and insulator 22 are apertured at 42 and the insulator grooved at 43 to vent the space between the hollow portion of the cutting blade and the jacket, thus dissipating heat therefrom so that the jacket is prevented from becoming unduly heated and transfer of heat to the handle is retarded.

Both of the handles are channel-shaped, the lower handle having its free end recessed at 44 and provided with lateral lugs 45 having apertures 46 therein. These lugs project sufficiently beyond each side of the handle that, should the tool be laid on either of its sides, the blade will be held out of contact with the surface on which the tool is resting. Secured to lugs 45 on the upper side of handle 11 is a relatively flat plate 47 which is somewhat wider than the width of the cutting blade and formed from a non-conducting material, but not sufficiently hard to damage the cutting edge of the blade. Also attached to the lugs is a gauge member 48 having formed integral therewith a centrally disposed depending portion 49. As will be seen from Figs. 4 and 5, the width of this depending portion is sufficient to bridge the space between the sides of the channel-shaped handle. The portion 49 is provided with two concave recesses 51, 51', one of the recesses being somewhat deeper than the other. When assembled with the lower handle, these recesses face outwardly with respect to the handle. Plate 47 and gauge 48 are shown as separate members, but, if desired, may be made into a single integral element.

When it is desired to remove a portion of the upper beak of a young fowl, the upper beak is placed over plate 47 and the lower beak is inserted in one of the other of the recesses 51, 51'. It will be understood that the lower beaks of very young fowl should be inserted in the more shallow of the recesses, while those of older fowl, the lower beaks of which are somewhat longer, are inserted in the deeper of the recesses. These recesses serve as guides and stops to limit the positioning of both beaks with respect to plate 47 and thereby form a reasonably accurate gauge by means of which the amount of the upper beak removed by the cutting operation is maintained uniform. Having placed the beaks over and under the plate 47, the upper handle and its associated heated cutting blade is forced downwardly to cut through the upper beak of the fowl and remove a portion thereof. The blade being quite hot will simultaneously cut and cauterize the beak of the fowl.

The cutting tool described herein is inexpensive, portable, relatively light in weight, easily manipulated with one hand while the fowl is held with the other hand, and is adapted to be connected to conventional and convenient sources of electric current. It has been found that it performs the operation of removing portions of the upper beaks of fowl rapidly and at the same time provides for accurate gauging of the portion removed. The beak is seated and cauterized coincidentally with the cutting operation so that bleeding is reduced to a minimum.

It is recognized that removal of the end of the upper beak of young fowl is desirable to counteract the tendency of the fowl to "pick" other fowl. This removal does not interfere seriously with eating and drinking and there is little or no effect on the health of fowl the beaks of which have been cut.

While a preferred embodiment of the invention has been described, it is obvious that modifications thereof may be made without affecting the operation of the tool; and, while the tool has been described with respect to the cutting of beaks, it is equally useful for clipping wings and claws. It is, therefore, intended that such changes and uses be included in the definition of the invention as set forth in the appended claims.

Having described my invention, what I claim as new and desire to secure by Letters Patent is:

1. A cutting tool for the purpose described comprising a pair of handles having a pivotal connection adjacent one end of the handles, an electrically heated cutting blade secured to the free end of one of said handles, a relatively flat plate on the free end of the other of said handles disposed in cutting relation to said blade, and a recessed gauge member attached to and underlying said said plate.

2. A cutting tool as claimed in claim 1 in which said member is provided with a plurality of recesses of different depths.

3. A cutting tool for the purpose described comprising a pair of handles having a pivotal connection adjacent one end of the handles, an electrically heated cutting blade secured to the free end of one of said handles, said blade including an elongated hollow portion and a terminal cutting edge, said terminal cutting portion being provided with a flange at each end of said cutting edge, said flange extending from said edge to said hollow portion, a heating element in said hollow portion, an insulating jacket surrounding said hollow portion and spacing the blade from said one handle, and a relatively flat plate on the free end of the other of said handles disposed in cutting relation to said blade.

4. A cutting tool for the purpose described comprising a pair of handles having a pivotal connection adjacent one end of the handles, a cutting blade having an extension with which electrical heating means are associated, an insulating shield surrounding said extension and said heating means and forming a support for said blade, said shield being secured to the free end of one of said handles, the free end of the other of said handles having an outwardly extending lateral lug formed thereon on each side of the handle, each of said lugs extending a substantial distance laterally of said cutting blade and said shield whereby, when said tool rests on its side on a surface, said shield and one of said lugs hold said cutting blade in spaced relation to said surface, and a relatively flat plate secured to said lugs, said plate being disposed in cutting relation to said blade.

5. A cutting tool for the purpose described comprising a pair of handles having a pivotal connection adjacent one end of the handles, an electrically heated cutting blade secured to the free end of one of said handles, said blade including an elongated hollow portion and a terminal cutting edge, a heating element in said hollow portion, an insulating jacket surrounding said hollow portion and spacing the blade from said one handle, said one handle being provided with a non-conducting grip member, a portion of said grip member extending upwardly to form a guard adjacent said heating element, and a relatively flat plate on the free end of the other of said handles disposed in cutting relation to said blade.

References Cited in the file of this patent

UNITED STATES PATENTS

| | | |
|---|---|---|
| 2,032,688 | Dart | Mar. 3, 1936 |
| 2,114,703 | Conner | Apr. 19, 1938 |
| 2,385,633 | Lyon | Sept. 25, 1945 |
| 2,662,962 | Green | Dec. 15, 1953 |